United States Patent
Ho et al.

(10) Patent No.: US 11,741,705 B1
(45) Date of Patent: *Aug. 29, 2023

(54) LOCATION TRACKING SYSTEM USING A PLURALITY OF CAMERAS

(71) Applicant: TP Lab, Inc., Palo Alto, CA (US)

(72) Inventors: Chi Fai Ho, Palo Alto, CA (US); Benson Junwun Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,347

(22) Filed: Jul. 19, 2022

Related U.S. Application Data (63) Continuation of application No. 16/799,834, filed on Feb. 25, 2020, now Pat. No. 11,436,827.

(51) Int. Cl.
*G06V 20/20* (2022.01)
*H04W 4/029* (2018.01)
*G06F 16/787* (2019.01)

(52) U.S. Cl.
CPC ............ *G06V 20/20* (2022.01); *G06F 16/787* (2019.01); *H04W 4/029* (2018.02); *G06V 2201/07* (2022.01)

(58) Field of Classification Search
CPC ... G06V 20/20; G06V 2201/07; H04W 4/029; G06F 16/787
See application file for complete search history.

(56) References Cited

U.S. PATENT DOCUMENTS

| | | | |
|---|---|---|---|
| 2018/0007315 A1* | 1/2018 | Kim | H04N 23/6811 |
| 2020/0019921 A1* | 1/2020 | Buibas | G01G 19/42 |
| 2020/0143561 A1* | 5/2020 | Hallett | G06V 20/52 |
| 2020/0193619 A1* | 6/2020 | Danielsson | G06F 18/25 |

* cited by examiner

*Primary Examiner* — Qun Shen
(74) *Attorney, Agent, or Firm* — Sunstein LLP (57) ABSTRACT

A tracking system obtains first recognized object and its first information, detected in image(s) captured by camera(s). The first information includes the first recognized object's first features, first feature locations, first real-world dimensions, and a first time. A list of tracking objects is obtained, each including a second recognized object and its second information. The second information includes the second recognized object's second features, second feature locations, and second real-world dimensions. The system compares the first features with the second features stored in a given tracking object, the first feature locations with the second feature locations, and the first real-world dimensions with the second real-world dimensions. When they match, the first information comprising the first time is stored in the given tracking object.

24 Claims, 8 Drawing Sheets

LOCATION TRACKING SYSTEM USING A PLURALITY OF CAMERAS

BACKGROUND OF THE INVENTION

Field

This invention relates generally to a location tracking system, and more specifically, to a location tracking system using a plurality of cameras.

Related Art

Location tracking is commonly deployed today. Technologies, like global positioning systems (GPS), allow the location of a device equipped with a GPS sensor to be tracked. A fleet management system tracks locations of trucks in a fleet, where each truck is installed with a GPS sensor. These trucks are tracked frequently so that the fleet management system knows the movement of the trucks. A location based game or application, such as Pokémon Go™ and Yelp™, tracks the location of a mobile phone to provide location based material or information to the mobile phone equipped with a GPS sensor. A driving navigation system tracks location and movement of a mobile phone or a navigation device with a GPS sensor to guide a driver. Other location tracking technologies, such as WiFi positioning system, Bluetooth beacons, and ultra-wideband based positioning systems, provide solutions for indoor location tracking or high-precision location tracking.

These location tracking technologies are intrusive as they require an object being tracked to be equipped with a positioning sensor such as a GPS sensor, a WiFi sensor, a Bluetooth sensor or an ultra-wideband frequency sensor.

In many scenarios, intrusive methods that require an object to carry a positioning sensor is not desirable nor effective. In one example, in a business area, such as a hotel, a campus, a business park, or a food court, guests and patrons are welcome to enjoy their services and businesses. However, it may not be desirable to require guests and patrons to wear or carry a sensor-equipped device or label in order to enjoy the services provided by the businesses. In a business office or building, a sensor-equipped device or tag is not effective for preventing theft since intruders often are knowledgeable enough to not carry such tracking devices or tags with them.

In another scenario, residents in a senior center or retirement center may need to have their movements outside of their rooms tracked so that nurses and care takers can locate the residents when necessary. In one scenario, a car entering a parking lot is tracked by a management system so that the car can be guided to a parking space.

The above scenarios illustrate a need for a non-intrusive location tracking system.

BRIEF SUMMARY OF THE INVENTION

Disclosed herein is a method for location tracking using a plurality of cameras, and a corresponding system and a computer program product as specified in the independent claims. Embodiments of the present invention can be freely combined with each other if they are not mutually exclusive.

According to one embodiment of the present invention, in a method for tracking an object in an area using a plurality of cameras, a tracking system obtains a first recognized object and first information associated with the first recognized object, the first recognized object being detected in at least one image captured by at least one camera of the plurality of cameras, the first information including at least two first features included in the first recognized object, at least two first locations of the at least two first features, first real-world dimensions of the first recognized object, and a first time. The tracking system obtains a list of a plurality of tracking objects, each tracking object including a second recognized object and second information associated with the second recognized object, the second information including at least two second features included in the second recognized object, at least two second locations of the at least two second features, and second real-world dimensions of the second recognized object. The tracking system compares the at least two first features included in the first recognized object with the at least two second features included in the second recognized object stored in a given tracking object, compares the at least two first locations of the at least two first features with the at least two second locations of the at least two second features, and compares the first real-world dimensions of the first recognized object with the second real-world dimensions of the second recognized object. In response to determining that the at least two first features match the at least two second features, the at least two first locations match the at least two second locations, and the first real-world dimensions matches the second real-world dimensions, the tracking system stores the first information comprising the first time in the given tracking object.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment," "an embodiment," "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
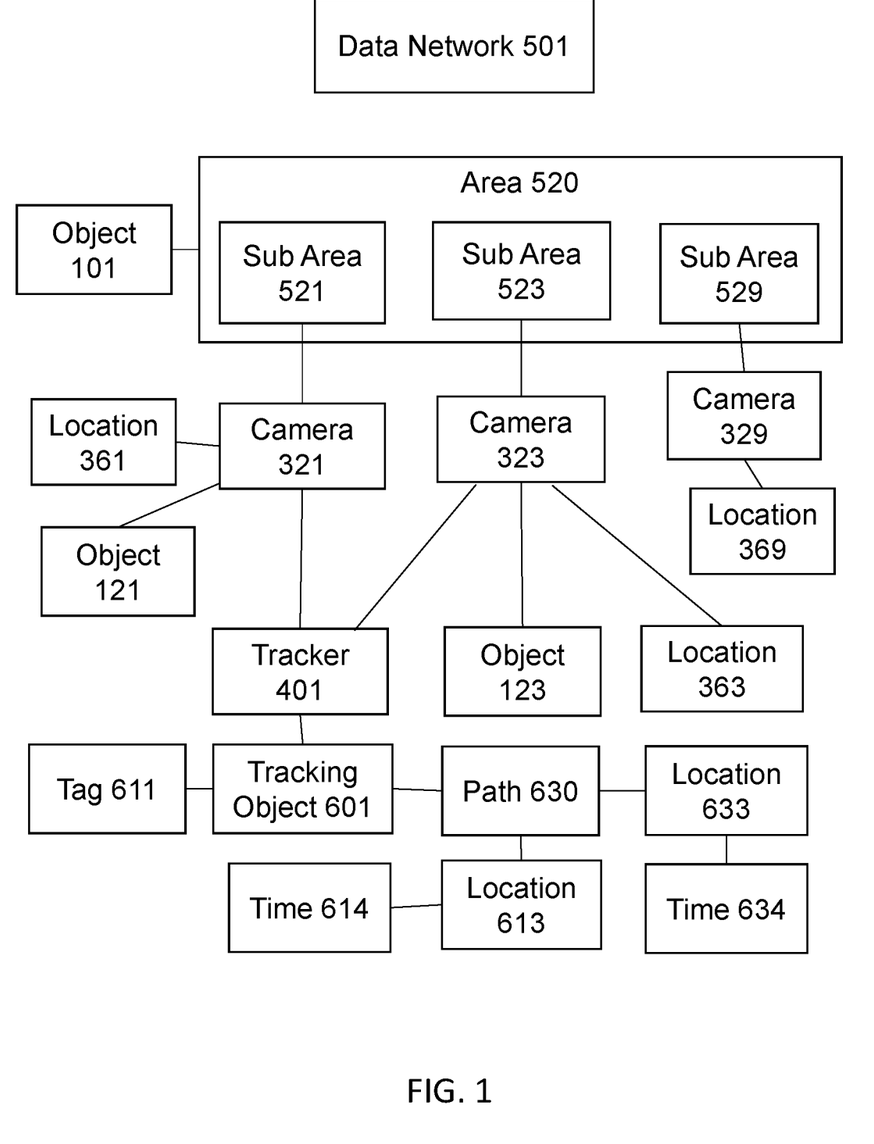
FIG. 1 illustrates an exemplary embodiment of a process for tracking an object in an area using a plurality of cameras.

FIG. 1 illustrates an exemplary embodiment of a process for tracking an object in an area using a plurality of cameras. In one embodiment, a plurality of cameras, such as camera 321, camera 323, and camera 329, are placed in various sub areas in an area 520. In one embodiment, camera 321 has a field of view that covers sub area 521, indicating a picture captured by camera 321 covers sub area 521. Camera 323 has a field of view that covers sub area 523, and camera 329 has a field of view that covers sub area 529. In one embodiment, sub area 521 and sub area 523 overlap so that the area in a picture captured by camera 321 overlaps with the area in a picture captured by camera 323. In one embodiment, camera 321, camera 323 and camera 329 are placed in area 520 at location 361, location 363 and location 369, respectively.

In one embodiment, the fields of view of the plurality of cameras cover the entire area 520 so that an object 101 that is present in area 520 is also present in a sub area covered by at least one of the plurality of cameras.

In one embodiment, an object 101 is present in area 520, and more specifically, present in sub area 521. In one embodiment, camera 321 captures a picture or image of sub area 521 and thus captures a picture or an image of object 101. Using image analysis of the captured image of object 101, object 101 is recognized and denoted as recognized object 121. In one embodiment camera 321 sends recognized object 121 information to a tracker 401 computing module. In one embodiment, instead of the camera 321 recognizing the object 121, the camera 321 sends the image of object 101 to the tracker 401. The tracker 401 receives image of object 101 from camera 321, recognizes object 101 in the image, and denotes the recognized object as object 121. In one embodiment, tracker 401 generates a tracking object 601 record for storing object 121 information, including locations and movements of object 101 in area 520. Tracker 401 generates a unique tag 611 for tracking object 601. In one embodiment, tracker 401 creates a path 630 to store locations of tracking object 601 as captured by the plurality of cameras. In one embodiment, tracker 401 stores location 613 of tracking object 601 in path 630 where location 613 includes a time 614 indicating when tracking object 601 was at location 613. In one embodiment, tracker 401 receives location 613 and time 614 from camera 321. In one embodiment, tracker 401 determines location 613 based on location 361 of camera 321 and image of object 101. In one embodiment, camera 321 determines location 613 based on location 361 of camera 321 and image of object 101. In one embodiment, time 614 is a time when camera 321 takes the image of object 101 in sub area 521. In one embodiment, time 614 is a time when tracker 401 receives the image of object 101 or object 121 information from camera 321.

In one embodiment, object 101 is present or moves to a different location in sub area 521. In one embodiment, camera 321 captures a second image of sub area 521 while object 101 is at the different location in sub area 521. Camera 321 processes the second image of object 101 in the manner described above and sends the second image of object 101 to the tracker 401. Alternatively, the camera 321 detects recognized object 121 in the second image and sends the recognized object 121 information from the second image to tracker 401. In one embodiment, tracker 401 compares the recognized object 121 from the second image and tracking object 601 and determines whether there is a match. In response to determining there is a match, the tracker 401 updates tracking object 601 with the recognized object 121 information from the second image. In one embodiment, tracker 401 updates path 630 with the location 613 and time 614 of the recognized object 121 for the second image.

In one embodiment, object 101 is present in an overlap area between sub area 521 and sub area 523. In one embodiment, camera 321 captures a picture of sub area 521 and thus captures a first image of object 101. Camera 321 processes the first image of object 101 in the manner described above and sends the first image of object 101 or the recognized object 121 information to tracker 401. When the first recognized object 121 is determined to match the tracking object 601, the location 613 and the time 614 for the first image are stored in path 630, as described above. In one embodiment, camera 323 captures an image of sub area 523, which includes the overlapping area with sub area 521. Thus, the image of sub area 523 includes a second image of object 101. In one embodiment, camera 323 processes the second image of object 101 in a manner similar to the processing of the first image of object 101 by camera 321, recognizes object 101 in the second image, and denotes the recognized object as object 123. Camera 323 sends object 123 information to tracker 401. In one embodiment, tracker 401 compares object 123 and tracking object 601 and determines there is a match. Tracker 401 updates tracking object 601 using object 123 information. In one embodiment, tracker 401 receives location 633 from camera 323, or determines location 633 of object 123 in sub area 523 using location 363 of camera 323 and the second image of object 101 captured by camera 323. In one embodiment, tracker 401 receives time 634 from camera 323, which indicates a time when the second image was captured or processed. Tracker 401 updates path 630 by adding location 633 and time 634 of object 123 to path 630.

In one embodiment, tracker 401 detects tracking object 601 over a period of time and updates path 630 in tracking object 601, where path 630 includes a plurality of locations at various times where tracking object 601 is captured by the cameras. In one embodiment, location 613 in path 630 includes an identity of camera 321 that captured an image of object 101 from which object 101 is recognized to be tracking object 601. In one embodiment, tracker 401 presents tracking object 601 and path 630 to a user, via an output device, in response to a query about tracking object 601.

In one embodiment, the plurality of cameras, including cameras 321, 323 and 329, are placed in various locations where their fields of view collectively cover area 520. When object 101 is present in area 520, an image of object 101 would be captured by one of the cameras, such as camera 321. Tracker 401 tags recognized object 121 in the image as tracking object 601 and creates a path 630 to record the movements or appearances of tracking object 601, representing the movements of object 101 around area 520 as captured by the plurality of cameras. Path 630 also records the locations and times of the captured images of object 101.

In one embodiment, tracker 401 is connected to an object identification system (not shown) which has a database of object features and identities, such as facial features and personal identifications, license plates and car registrations, name tag labels and name registration, or other feature and identification records. Tracker 401 matches tracking object 601 with one or more entries in the database of object features and identities of the object identification system to determine an identification of the tracking object 601, such as a person name, a car registration, a name registration, or individual object identity for tracking object 601.

In one embodiment, object 101 is a child and tracker 401 follows the child as the child moves around area 520. In one embodiment, object 101 does not match any entries in the database of personal or known identities and tracker 401 can nevertheless follow object 101 and record movement of object 101. In one embodiment, object 101 is a car or vehicle, and tracker 401 tracks and follows the car as it enters area 520, such as a parking lot. In one embodiment, tracker 401 tracks a hospital patient, a business guest, an office visitor, an animal, or an employee. In one embodiment, tracker 401 can send an alert to a security system with the locations, times and movement of object 101. In one embodiment, tracker 401 records the movement of object 101 and alerts a police station or a security center.

Figure 2:
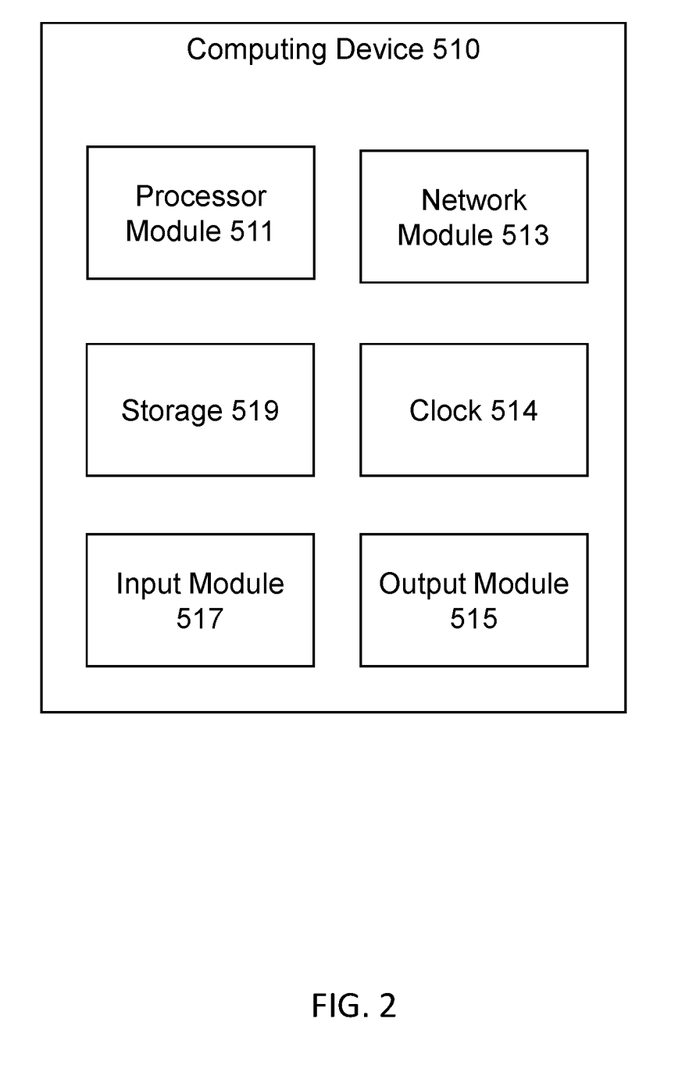
FIG. 2 illustrates an embodiment of a computing device.

FIG. 2 illustrates an exemplary embodiment of hardware components of a computing device which can be used for a controller or to house a controller. In one embodiment, computing device 510 includes a processor module 511, an output module 515, an input module 517, and a storage module 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, an NFC network, a personal area network (PAN), a WiFi network, or a LiFi network. Storage 519 includes executable instructions when read and executed by the processor module 511 of computing device 510 implement one or more functionality of the current invention. In one embodiment, storage 519 stores images, pictures, data associated to the stored images or pictures, one or more attributes associated to one or more sensors connected to computing device 510.

In one embodiment computer device 510 includes a clock 514, which provides date and time information to computing device 510.

In one embodiment, computing device 510 does not include all the modules. In one embodiment, computing device 510 does not have network module 513 or clock 514.

Figure 3:
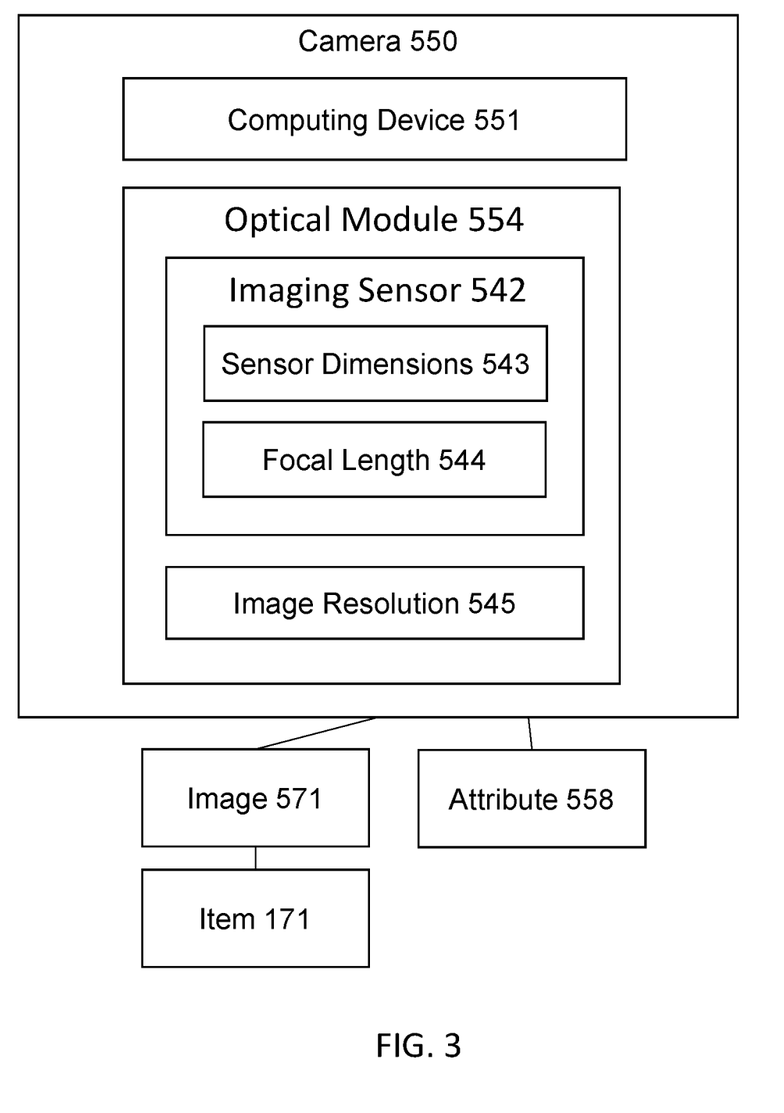
FIG. 3 illustrates an embodiment of a camera device.

FIG. 3 illustrates an embodiment of a camera device. In one embodiment, camera device or camera 550 includes an optical module 554. In one embodiment, camera 550 contains an optical module 554 which includes an imaging sensor 542. In one embodiment, optical module 554 includes one or more of an infra-red sensor, a night-vision sensor and emitter, an RGB sensor, and an optical lens. In one embodiment, imaging sensor 542 has a sensor dimension 543. In one embodiment, camera 550 captures an image 571 using a focal length 544 of imaging sensor 542 with an image resolution 545. In one embodiment, sensor dimension 543 describes an area of image sensor 542 of camera 550 such as 4.17 mm, 3.2 mm, or a length measured in different unit length. In one embodiment, attribute 558 is a number indicating a relationship between a distance of item 171, a real world size of item 171, and the image size of item 171 as captured in image 571. Embodiments for processing images captured by camera 550 are illustrated in co-pending U.S. patent application Ser. No. 16/254,581, filed on Jan. 22, 2019, entitled "Controller for Measuring Distance from Reference Location and Real Size of Object Using a Plurality of Cameras" (referred to herein as "the '581 Application"), and issued as U.S. Pat. No. 11,060,864 on Jul. 13, 2021. The '581 Application is incorporated herein by reference.

In one embodiment, camera device 550 includes a computing device 551.

Returning to FIG. 1, in one embodiment, tracker 401 includes a computing device connecting to the plurality of cameras over data network 501. In one embodiment, tracker 401 includes a server computing device residing in a server room, a data center, or a vehicle housing a plurality of computing devices. In one embodiment, tracker 401 computing device houses or connects directly to one of the plurality of cameras, for example camera 321, and connects to other cameras via data network 501.

In one embodiment, area 520 includes a business park, a business building, an office, a campus, a residence hall, a residence complex, an apartment, a theme park, a park, a part or an entire building structure, a sport center, a playground, a shopping mall or area, an airport, a warehouse, a department store, a hospital, or an enclosed area. In one embodiment, area 520 includes a conference room, a ball room, a corridor, a hallway, a story of a building, a storage room, a lecture hall, a store, a classroom, a gym, a child center, an exhibition room, or a part of a building or campus.

In one embodiment, sub-area 521 is an area within area 520. Sub-area 521 is within the field of view of camera 321. In one embodiment, sub-area 521 covers a section of a room, a section of a hallway, a small area of a park, an isle of a store, or a small section of area 520. In one embodiment, sub-area 521 is placed or positioned with consideration of camera 321 attributes, such as optical lens focus and imaging sensor resolution, so that an image of object 101 captured while the object 101 is present in sub-area 521 has sufficient resolution to be analyzed and objects recognized. In one embodiment, sub-area 521 and sub-area 523 are defined to include an overlap area, where when object 101 is present in the overlap area, images of object 101 are captured by both camera 321 and camera 323, and where the images of object 101 in sub-area 521 and sub-area 523 have sufficient resolution to be analyzed and objects recognized as described herein.

In one embodiment, object 101 includes a person, a head, a face, an animal, a vehicle, a robot, a bicycle, a moving object. In one embodiment, object 101 includes a license plate, a label, a card, an employee identification tag or card, a hat, a helmet, or a head-mount object. In one embodiment, object 101 includes a jacket, a lab coat, a company uniform, a piece of clothing, a logo, a pattern, or a colored pattern. In one embodiment, object 101 includes a plurality of above objects.

In one embodiment, object 121 is recognized from an image of object 101 and may include an image of a part of object 101 or the entirety of object 101. Object 121 may include a face, a head, a car, a van, a vehicle, a cart, a name tag, a label, a coat, or a jacket.

In one embodiment, location 361 of camera 321 includes coordinates of camera 321 on a map, a map of area 520, or a facility map. In one embodiment, location 361 includes a building number or name, a floor number, a room number or name, a park area name, a street, an office number or name, a name of area 520, or a name of sub area 521. In one embodiment, location 613 of tracking object 601 includes coordinates on a map, a map of area 520, or a facility map. In one embodiment, location 613 includes an identity of a room, a building, a floor, a sub area, a hallway, a store, an office, an apartment, or an identity understandable by humans for locating tracking object 601.

In one embodiment, data network 501 includes a wireless data network such as a cellular network, a mobile network, a Bluetooth network, an NFC network, a personal area network (PAN), a WiFi network, or a LiFi network. In one embodiment, data network 501 includes a private network, a public network, a data center network, a corporate network, a building data network, a campus data network, or the Internet.

Figure 4A:
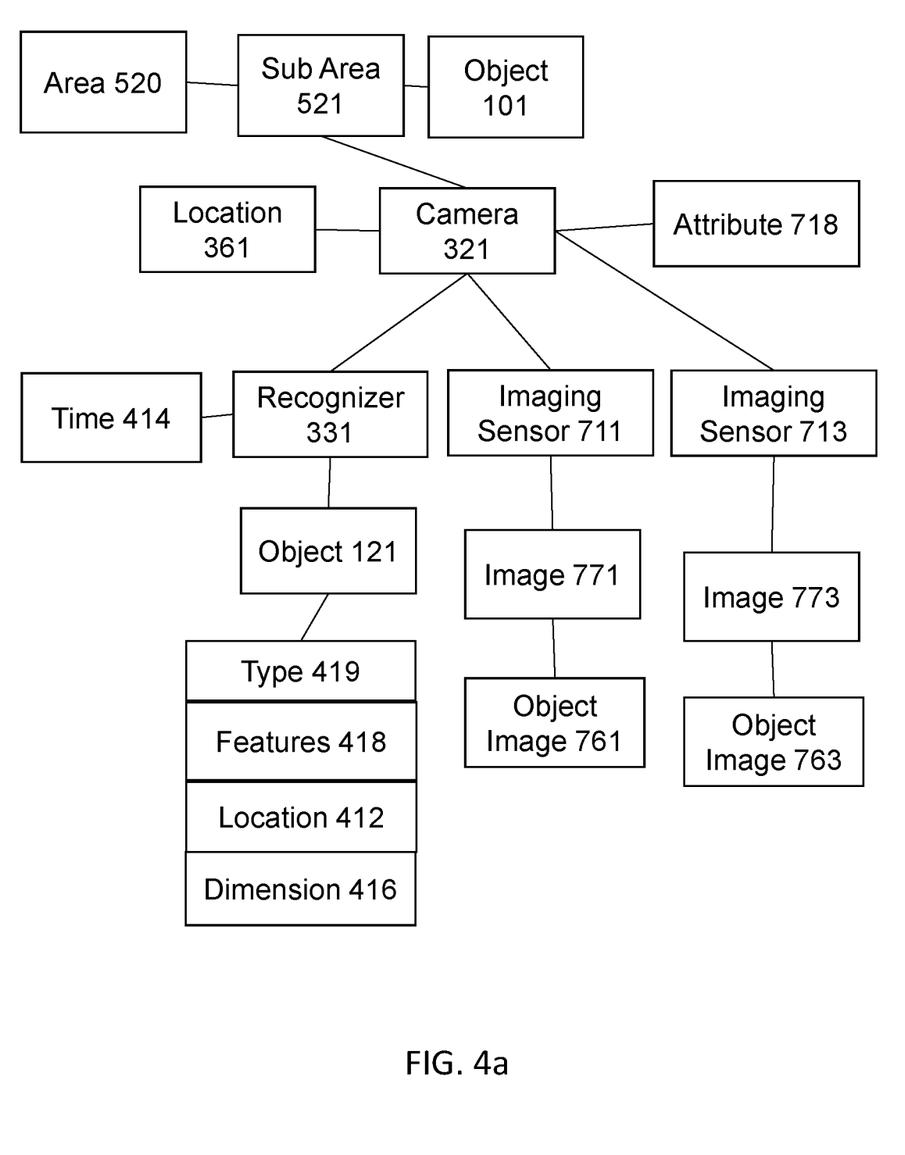
FIG. 4a illustrates an embodiment of a process for determining a location of an object using a camera device.

FIG. 4a illustrates an embodiment of a process for determining a location of an object using a camera device. In one embodiment, camera 321 includes a plurality of synchronous image sensors, such as imaging sensor 711 and imaging sensor 713. In one embodiment, camera 321 instructs imaging sensor 711 and imaging sensor 713 to capture image 771 and image 773, respectively, of sub area 521 at approximately the same time 414. Image 771 contains object image 761, which is an image of object 101, and image 773 contains object image 763, which is another image of object 101. In one embodiment, camera 321 connects to a recognizer 331 which instructs camera 321 at time 414 to capture image 771 and image 773.

In one embodiment, as described in the '581 Application, recognizer 331 performs image analysis on object image 761 and object image 763 and recognizes object 121 in both object images 761 and 763. Recognizer 331 obtains attribute 718 for camera 321, which includes camera distance index of imaging sensor 711 and imaging sensor 713. Together with object image 761 dimension and position of object 121 in image 771 and object image 763 dimension and position of object 121 in image 773, calculated as described in the '581 Application, recognizer 331 determines location 412 of object 101 relative to location of camera 321 and physical or real-world dimension 416 of object 121, also as described in the '581 Application. In one embodiment, recognizer 331 obtains location 361 of camera 321 in area 520 and calculates location 412 of object 101 in area 520.

In one embodiment, recognizer 331, through image analysis, recognizes one or more features 418 of object 121. In one embodiment, recognizer 331 recognizes object 121 to include a human or animal face and recognizes features 418 to include one or more of an eye, a nose, a mouth, an ear, a cheek, a hair line, a hair color, and an iris color. In one embodiment, recognizer 331 identifies and stores an object type 419 for object 121, indicating a category applicable to the object 121, such as a human face, an animal face or a face. In one embodiment, recognizer 331 selects an object type, such as a human face, and determines whether the recognized features 418 match the features of the selected object type. In one embodiment, recognizer 331 determines features 418 match the features associated with the selected object type, and in response, recognizer 331 stores the selected object type in type 419 for object 121. In one embodiment, recognizer 331 may determine locations and real-world sizes of features 418 and stores the locations and sizes in location 412 and dimension 416, respectively. In one embodiment, type 419 is an automobile or a vehicle and the features 418 associated with type 419 include one or more of a license plate, a head light, a door, a shape, a color, a windshield, a tire, a driver, a passenger, a blade, a sign, a sticker, or an external vehicle feature. In one embodiment, type 419 is a fruit, a cup, a plate, a card, an access card, a label, a printed code such as a QR-code, a piece of furniture, a briefcase, a phone, a piece of clothing, a jacket, a skirt, or a shoe.

Figure 4B:
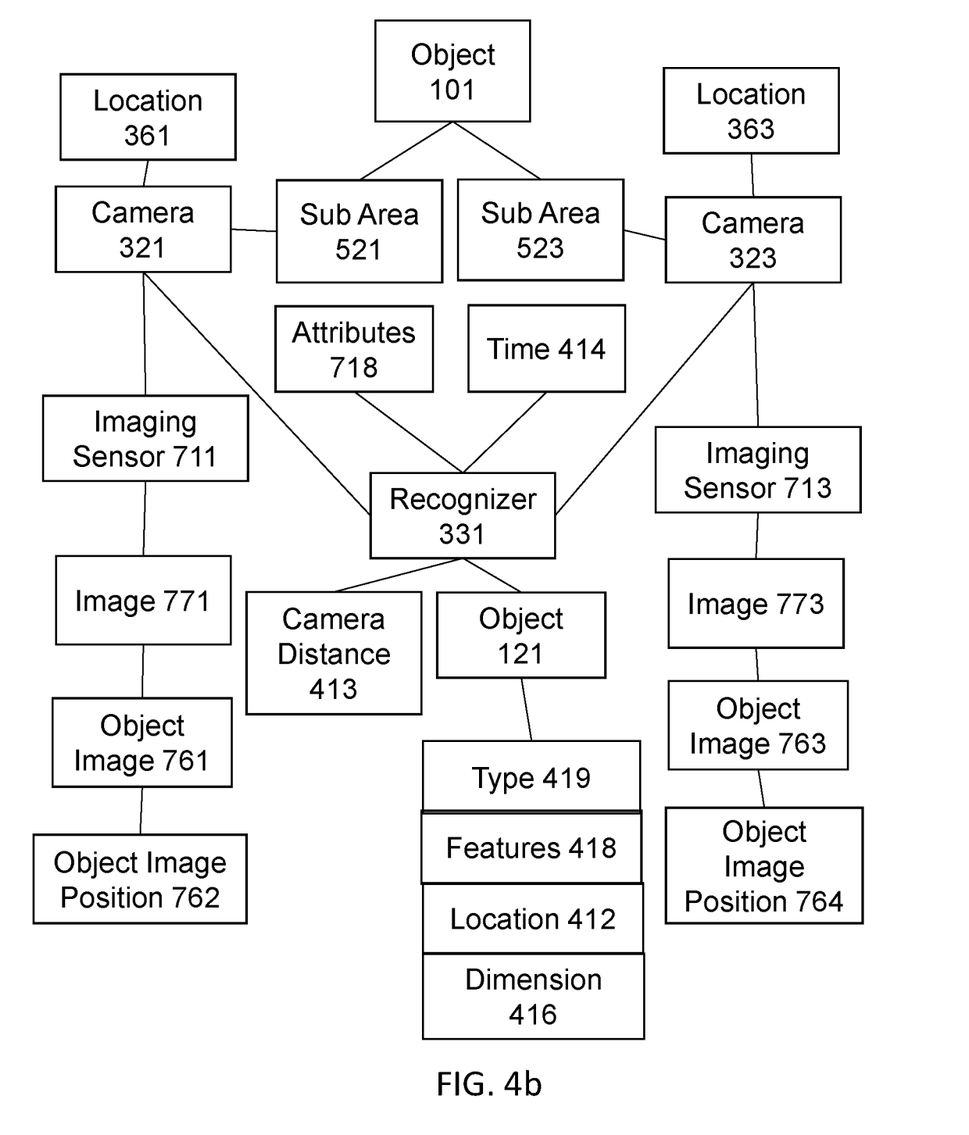
FIG. 4b illustrates an embodiment of a process for determining a location of an object using at least two camera devices.

FIG. 4b illustrates an embodiment of a process for determining a location of an object using at least two camera devices. In one embodiment, camera 321 and camera 323 are connected to a recognizer 331. Camera 321 includes an imaging sensor 711, and camera 323 includes an imaging sensor 713. In one embodiment, recognizer 331 instructs camera 321 and camera 323 to capture image 771 of sub area 521 and image 773 of sub area 523 approximately simultaneously at time 414. In one embodiment, image 771 includes object image 761 of object 101 in sub area 521, and image 773 includes object image 763 of object 101 in sub area 523. Recognizer 331 obtains image 771 from camera 321 and image 773 from camera 323.

In one embodiment, recognizer 331 detects and recognizes object 121 through image analysis of object image 761 in image 771. Recognizer 331 further detects and recognizes object 121, through image analysis of object image 763 in image 773, as the same object 121 recognized from image 771. In one embodiment, recognizer 331 detects and recognizes features 418 of object 121 through image analysis of object image 761 and object image 763. In one embodiment, object 121 includes a head of a person or an animal. Features 418 of the head include one or more of an eye, a nose, a mouth, an ear, a cheek, a pair of glasses, a hair region, a boundary around the head, and other facial landmarks. In one embodiment, object 121 is a vehicle such as an automobile, a car, a van or a bus. Features 418 of the vehicle include one or more of a head light, a taillight, a side mirror, a door, a license plate, a windshield, a rear windshield, a side windshield, a logo, and a tire. Different images captured by different camera may include a different sub-set of features of the same object. As described further below, features 418 may include a combination of the sub-set of features of the same object as captured by at least two cameras. In one embodiment, object image 761 includes object image position 762, which includes a position and image dimensions of object image 761 in image 771. Object image 763 includes object image position 764, which includes a position and image dimensions of object image 763 in image 773. In one embodiment, recognizer 331 includes or obtains attributes 718 of image sensor 711 of camera 321 and of image sensor 713 of camera 323. In one embodiment, recognizer 331 obtains location 361 of camera 321 and location 363 of camera 323 and determines a camera distance 413 between camera 321 and camera 323. Using a similar process described in the '581 Application, recognizer 331 calculates a location 412 of object 121 relative to camera 321 and real-world dimension 416 of object 121 using the attributes 718 and camera distance 413. In one embodiment, location 412 indicates a location in sub area 521, which is also a location in sub area 523 since object 101 is present in the overlap area for sub areas 521 and 523. In one embodiment, location 412 includes locations of features in features 418. In one embodiment, dimension 416 includes real-world dimensions of features in features 418. In one embodiment, recognizer 331 stores location 412 and dimension 416 in features 418. In one embodiment, object 121 is determined to have an object type of a face and features 418 associated with this object type include a facial landmark, such as an eye or a nose. Location 412 includes the locations or coordinates of the eye, the nose or the facial landmark relative to the face in object 121, relative to camera 321, or relative to area 520. Dimension 416 includes real-world sizes of the eye, the nose or the facial landmark of object 121. In one embodiment, object 121 is determined to have an object type of a vehicle and features 418 associated with this object type include a vehicle feature, such as a headlight, a taillight, or a license plate. Location 412 includes the locations or coordinates of the headlight, the taillight, the license plate or the vehicle recognized feature relative to the vehicle in object 121, relative to camera 321, or relative to area 520. Dimension 416 includes the real world size of the headlight, the taillight, the license plate or the vehicle recognized feature.

In one embodiment, recognizer 331 derives additional features of object 121 from features 418 and stores the additional features in features 418. In one embodiment, object 121 is identified as object type 419 "face" and features 418 associated with object type 419 "face" include two eyes. Recognizer 331 derives an additional feature of an inter-pupil distance (IPD) between the two eyes. In one embodiment, object 121 is identified as object type 419 "person" and features 418 associated with object type 419 "person" include a head. Recognizer 331 derives a height of the person as the peak position of the head region. In one embodiment, object 121 is identified as object type 419 "vehicle" and features 418 associated with object type 419 "vehicle" include headlights, logo, windshield and other car features, allowing recognizer 331 to derive a make and model of the vehicle. In one embodiment, features 418 include a license plate and recognizer 331 derives a license plate number.

Figure 5:
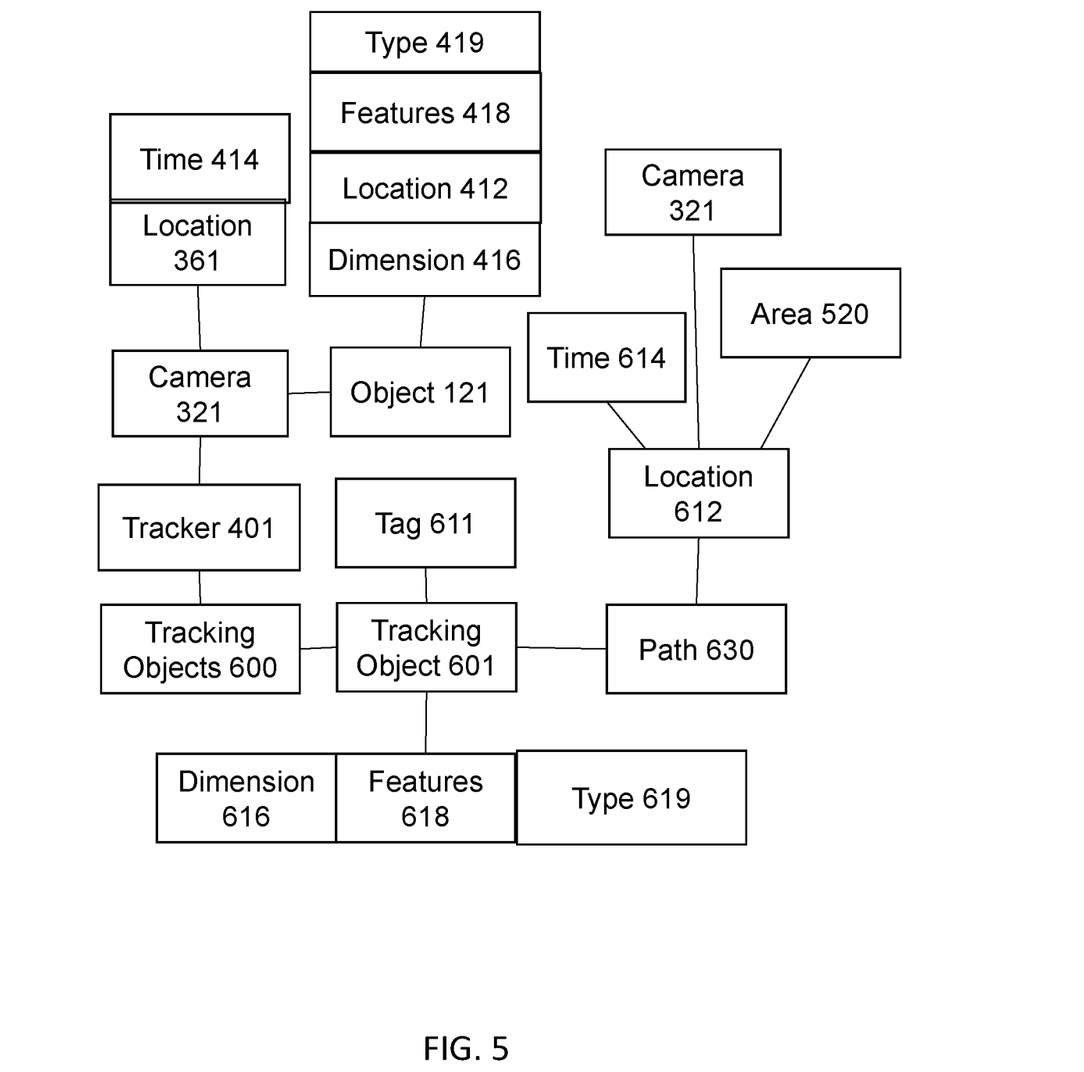
FIG. 5 illustrates an embodiment of a process for tracking an object using a camera device.

FIG. 5 illustrates an embodiment of a process for tracking movements of an object using a camera device. In one embodiment, tracker 401 receives a recognized object 121 from camera 321 or recognizes object 121 through analysis of images from camera 321. Tracker 401 receives information associated with object 121, including some combination of features 418, dimension 416, location 412, and time 414. In one embodiment, tracker 401 also receives a location 361 of camera 321. In one embodiment, tracker 401 stores tracking objects 600 which includes a list of objects whose movements are being tracked. Upon receiving object 121, tracker 401 compares object 121 with the list in tracking objects 600. In one embodiment, tracker 401 matches object 121 with one of the object on the list in tracking objects 600, and object 121 is further processed as described below with reference to FIG. 6. In one embodiment, tracker 401 determines object 121 does not match any of the objects on the list in tracking objects 600. Tracker 401 generates a new tracking object 601 associated with object 121 and adds the tracking object 601 to the list in tracking objects 600.

In one embodiment, tracker 401 creates a unique tag 611 for tracking object 601. Tracker 401 stores tag 611 in tracking object 601. In one embodiment, tracker 401 stores features 418 as features 618 in tracking object 601. In one embodiment, tracker 401 calculates additional features from features 418, as described above, and stores any additional features not already included in features 618. In one embodiment, tracker 401 stores dimension 416 as dimension 616 in tracking object 601. In one embodiment, tracker 401 stores type 419 of object 121 as type 619 of tracking object 601.

In one embodiment, tracker 401 generates a path 630 in tracking object 601 and uses path 630 to track movement of the object 121 associated with tracking object 601. In one embodiment, tracker 401 generates location 612 for a location of tracking object 601. In one embodiment, tracker 401 stores location 412 as location 612. In one embodiment, location 412 is a location relative to camera 321, and tracker 401 combines location 412 and location 361 of camera 321 to create a combined location in area 520 and stores the combined location as location 612. In one embodiment, tracker 401 stores time 414 as time 614 in location 612. In one embodiment, tracker 401 stores information for camera 321 in location 612, such as camera 321 identity and/or image captured by camera 321 used to recognized object 121. Location 612 records a time 614, a location in area 520, and optionally an identity of the camera 321 which captured an image of tracking object 601 .

In one embodiment, tracker 401 stores location 612 in path 630, stores path 630 in tracking object 601, and stores tracking object 610 on the list of objects in tracking objects 600.

Figure 6:
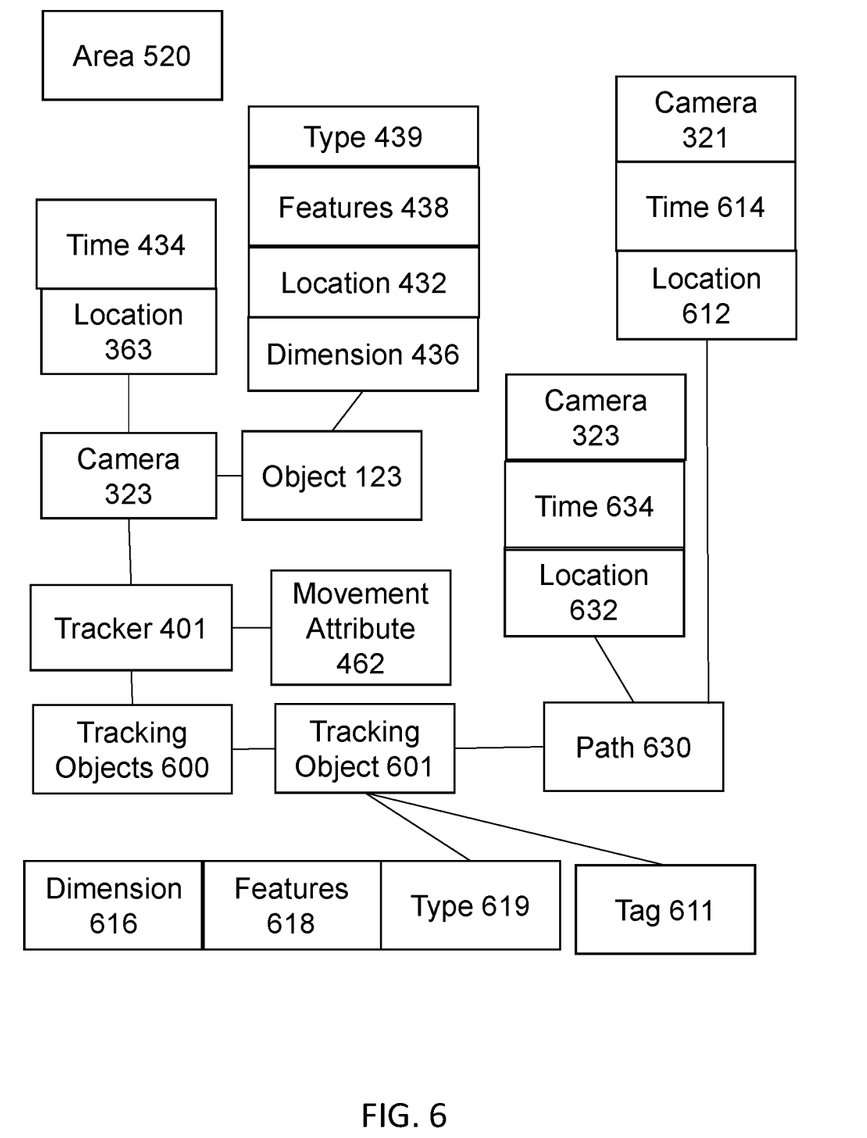
FIG. 6 illustrates an embodiment of a process for tracking movements of an object using a plurality of camera devices.

FIG. 6 illustrates an embodiment of a process for tracking movements of an object using a plurality of camera devices. In one embodiment, tracker 401 receives a recognized object 123, and its associated features 438, location 432, and dimension 436, from camera 323 or recognizes object 123 through analysis of images captured by camera 323. In one embodiment, tracker 401 receives location 363 of camera 323 and the time 434 when object 123 is recognized from an image captured by camera 323. Tracker 401 compares object 123 with the list of objects in tracking objects 600. In one embodiment, tracker 401 determines that object 123 matches tracking object 601 on the list of objects in tracking objects 600. In response, tracker 401 selects tracking object 601. Tracker 401 matches object 123 with tracking object 601 by matching features 438 and dimension 436 of object 123 with features 618 and dimension 616 of tracking object 601, respectively. In one embodiment, tracker 401 matches an IPD in features 618 against IPD in features 438 and a height in features 618 against a height in features 438. In one embodiment, tracker 401 matches a make or model in features 618 against a make or model in features 438. In one embodiment, tracker 401 matches a license plate number in features 618 against a license plate number in features 438.

In one embodiment, features 438 and dimension 436 do not match features 618 and dimension 616. In one embodiment, tracker 401 determines IPD or height in features 618 does not match that in features 438. In one embodiment, tracker 401 determines dimensions of an eye or a nose in dimension 616 does not match that in dimension 436. In one embodiment, tracker 401 determines a license plate number, a model, or a make of a vehicle in features 618 does not match the license plate number, model or make of a vehicle in features 438. In one embodiment, tracker 401 determines dimension of a headlight, a windshield, and a side window in dimension 616 do not match the dimensions of a headlight, a windshield, and a side window in dimension 436. When tracker 401 determines object 123 does not match tracking object 601, tracker 401 selects another tracking object on the list in tracking objects 600 for comparison. In one embodiment, when tracker 401 determines object 123 does not match any tracking object on the list in tracking objects 600, tracker 401 creates a new tracking object for object 123, as described above.

In one embodiment, when comparing object 123 and tracking object 601, tracker 401 determines whether features 438 and dimension 436 of object 123 match features 618 and dimension 616 of tracking object 601. In one embodiment, tracker 401 further compares location 432 with the most recent location 612 in path 630, where location 612 includes the most recent time 614 prior to time 434. In one embodiment, tracker 401 compares type 439 of object 123 with type 619 of tracking object 601.

In one embodiment, when comparing object 123 and tracking object 601, tracker 401 obtains movement attribute 462 associated with tracking object 601. In one embodiment, tracker 401 selects movement attribute 462 based on type 619 of tracking object 601. In one embodiment, tracking object 601 is a person or type 619 indicates a person. Movement attribute 462 associated with type 619 "person" includes a normal speed and a maximum speed of a person. In one embodiment, tracking object 601 is a vehicle or type 619 indicates a car, a van or a truck. Movement attribute 462 associated with type 619 "car", "van" or "truck" includes a normal speed, a maximum speed of a vehicle. In one embodiment, movement attribute 462 is based on the type of area 520. In one embodiment, area 520 includes a shopping mall, and movement attribute 462 associated with area type "shopping mall" includes a walking speed such as 1 mph, 2 kmph, or 4 kmph. In one embodiment, area 520 includes a running track and movement attribute 462 associated with area type "running track" includes a running speed such as 5 mph, or 10 kmph. In one embodiment, area 520 includes a parking lot and movement attribute 462 associated with area type "parking lot" includes a driving speed of a vehicle such as 5 mph, 10 kmph or 15 kmph. In one embodiment, location 432 is a location relative to location 363 of camera 323. Tracker 401 combines location 432 and location 363 and updates location 432 to the combined location in area 520. Location 432 indicates a location in area 520 where object 123 is captured by camera 323 at time 434. Tracker 401 calculates the difference between location 612 in path 630 of tracking object 601 and location 432 of object 123, and the difference between time 614 associated with location 612 and time 434 associated with location 432. The differences indicate that tracking object 601 have moved from location 612 to location 432 between time 614 and time 434. Tracker 401 determines whether such movement from location 612 to location 432 between time 614 and time 434 is consistent for type 619 based on movement attribute 462 associated with type 619, such as a speed, an acceleration or a velocity vector. In one embodiment, location 612 and location 432 differ by 6 feet and time 434 is a second after time 614. In one embodiment, movement attribute 462 includes a speed of 5 mph, and tracker 401 determines that such movement is consistent with the movement attributes 462 for type 619. In one embodiment, movement attribute 462 includes a speed of 2 mph, and tracker 401 determines that such movement is not consistent with the movement attribute 462 for type 619. In one embodiment, tracker 401 determines, for example, that location 432 is beyond the range of movement of tracking object 601 of type 619 based on a maximum speed set forth in movement attribute 462. In response, tracker 401 determines that object 123 does not match tracking object 601.

In one embodiment, tracker 401 determines location 432 is a location reachable by tracking object 601 from location 612 within the time between time 614 and time 434. In response, tracker 401 determines that object 123 matches tracking object 601. Tracker 401 proceeds to update tracking object 601 using object 123. In one embodiment, tracker 401 updates features 618 of tracking object 601 with features 438, when feature 438 includes additional features not in feature 618. In one embodiment, tracker 401 updates dimensions 616 using dimension 436, when dimension 436 includes an additional dimension or a more accurate dimension.

In one embodiment, in response to matching object 123 with tracking object 601, tracker 401 records a new location 632 in path 630. Tracker 401 stores location 432 of object 123 in location 632, and stores time 434 of object 123 in time 634 of location 632. In one embodiment, tracker 401 additionally stores an identity of camera 323 and/or an image from which object 123 was recognized in location 632.

Figure 7:
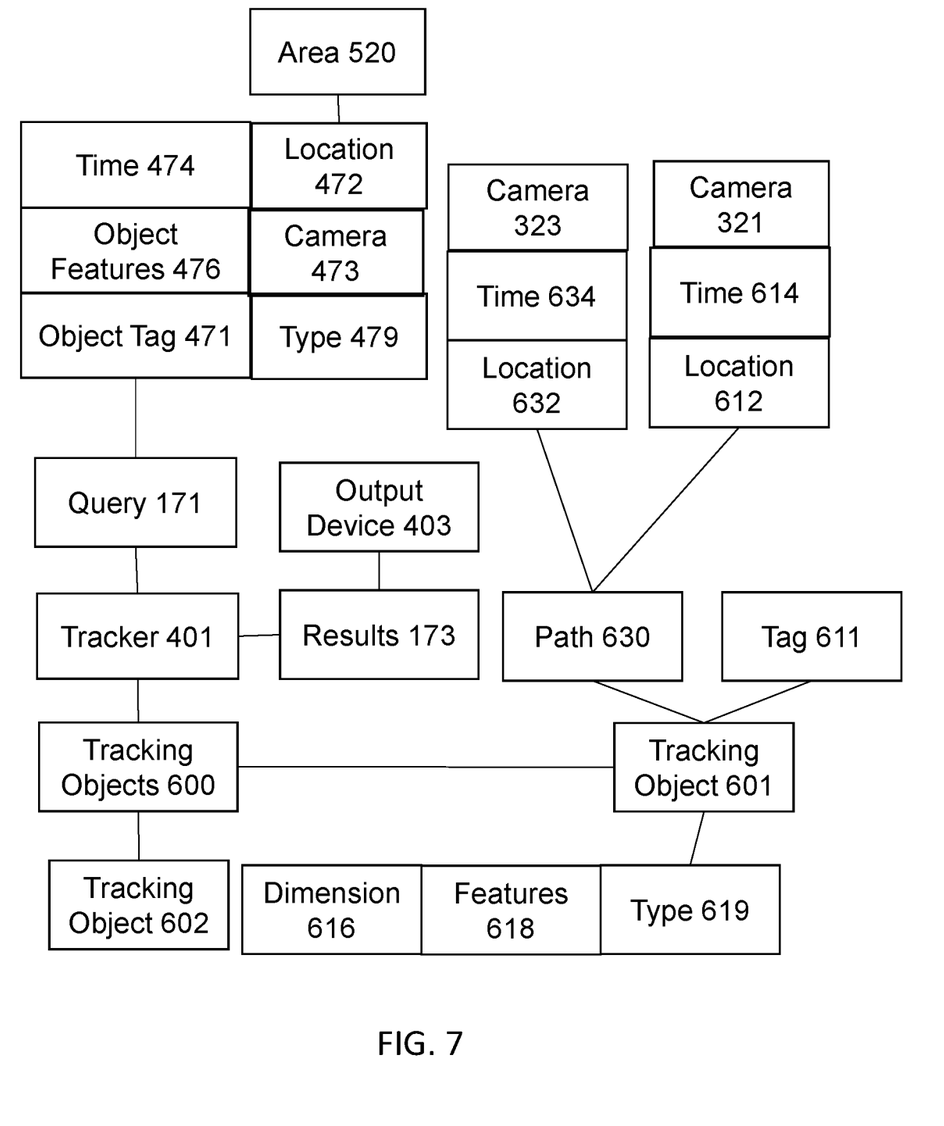
FIG. 7 illustrates an embodiment of a process for reporting movements of a tracked object.

FIG. 7 illustrates an embodiment of a process for reporting movements of a tracked object. In one embodiment, tracker 401 receives a query 171 about tracking objects 600. Query 171 may be sent by a user or a remote computing device connecting to tracker 401 over a data network. Query 171 may be pre-stored in a storage of tracker 401. In one embodiment, query 171 includes a number of criteria, including but not limited to one or more of an object tag 471, object features 476, location 472, time 474, and camera 473 identity. Tracker 401 processes query 171 and selects any tracking object that matches the criteria in the query 171, e.g., tracking object 601 from the list of objects in tracking objects 600. Tracker 401 generates results 173 using the matching tracking object 601. In one embodiment, tracker 401 sends results 173 as a response to query 171. In one embodiment, tracker 401 sends results 173 to an output device 403 for presentation to the user, where the output device 403 may include one or more of a speaker for audio output, a display for visual output or video output, or a remote device for alert notification.

In one embodiment, tracker 401 matches query 171 with tracking object 601 of tracking objects 600 and, in response, selects tracking object 601. In one embodiment, to determine whether tracking object 601 matches the criteria in the query 171, tracker 401 compares object identity 471 in the criteria in the query 171 with the unique tag 611 of tracking object 601. In one embodiment, to determine whether tracking object 601 matches the criteria in the query 171, tracker 401 compares the identity of camera 473 in the criteria in the query 171 with cameras identified in the path 630, e.g., camera 321 of location 412 in path 630. In one embodiment, tracker 401 determines there is no match between the criteria in query 171 and the objects on the list in tracking objects 600, and in response, tracker 401 returns an indication of no matches as a response to query 171.

In one embodiment, to determine whether path 630 matches the criteria in the query 171, tracker 401 compares time 474 in the criteria in query 171 to path 630 of tracking object 601. In one embodiment, time 474 includes a time range or duration, and when time 634 in location 632 in path 630 falls within time 474 range, tracker 401 determines path 630 matches the criteria in the query 171. In one embodiment, when time 474 falls between time 614 of location 612 and time 634 of location 632 in path 630, tracker 401 determines that path 630 matches the criteria in the query 171. In one embodiment, tracker 401 determines path 630 does not match the criteria in the query 171 when there is no location in path 630 matching time 474.

In one embodiment, to determine whether path 630 matches the criteria in the query 171, tracker 401 compares location 472 in the criteria in query 171 to path 630. In one embodiment, location 472 includes a coordinate in area 520, a room, a hallway, or a region in area 520. When tracker 401 matches location 472 with locations in path 630, the tracker 401 determines that path 630 matches the criteria in the query 171. In one embodiment, tracker 401 compares location 472 and location 612 of path 630 to determine whether location 472 and location 612 overlap or are within a pre-determined distance. If the comparison is affirmative, tracker 401 determines location 612 in path 630 matches location 472, and thus path 630 matches the criteria in the query 171. In one embodiment, tracker 401 determines there is no location in path 630 matching location 472, and in response, tracker 401 determines path 630 does not match the criteria in the query 171.

In one embodiment, the criteria in the query 171 includes one or more object features 476. In determining whether tracking object 601 matches the criteria in the query 171, tracker 401 compares object features 476 in the criteria with features 618 of tracking object 601. In one embodiment, object features 476 includes real world dimensions, and tracker 401 compares the real-world dimensions of object feature 476 with dimension 616 of tracking object 601. In one embodiment, object features 476 do not include real world dimensions but includes dimensions measured in pixels or a unit of length. Tracker 401 calculates ratios of the dimension of the features in object feature 476, calculates ratios of the real-world dimension 616 corresponding to features 618, and compares the two sets of ratios to determine whether there is a match. In one embodiment, tracker 401 determines all object features 476 have a match in features 618 or vice versa, and in response, tracker 401 determines that object features 476 match the features 618 in tracking object 601. In one embodiment, tracker 401 determines that a threshold number, e.g., 90% or 85% of object features 476, match features 618 or vice versa, and in response, tracker 401 determines the features 618 of tracking object 601 matches object features 476. For example, in one embodiment, features 618 of tracking object 601 matches object features 476 when one eye, one nose, one mouth match, although the IPD in features 618 and object features 476 do not match. In response, tracker 401 considers features 618 of tracking object 601 to match object features 476. In one embodiment, features 618 of tracking object 601 is determined to match object features 476 when a car model and make, a license plate number, and one headlight match, although another headlight does not match. In response, tracker 401 considers tracking object 601 to match object features 476.

In one embodiment, query 171 includes type 479. To determine whether tracking object 601 matches the criteria in the query 171, tracker 401 compares type 479 in the criteria with type 619 of tracking object 601.

In one embodiment, tracker 401 processes all criteria in query 171 and determines tracking object 601 matches all criteria. In response, tracker 401 determines tracking object 601 matches query 471.

In one embodiment, tracker 401 determines tracking object 601 matches the criteria in the query 471 and selects tracking object 601 to compose results 173. Tracker 401 includes in results 173 information from tracking object 601, including one or more of tag 611, features 618, dimension 616, path 630, matching location 612, matching location 632. In one embodiment, location 632 does not match query 171, and tracker 401 does not include location 632 in results 173. In one embodiment, tracker 401 also determines that tracking object 602 matches the criteria in the query 471, and tracker 401 includes information of tracking object 602 in results 403.

In one embodiment, output device 403 includes a speaker, and tracker 401 instructs output device 403 to convert results 173 to audio signals to be played by the speaker. In one embodiment, output device 403 includes a display. In one embodiment, tracker 401 instructs output device 403 to display one or more of tag 611, dimension 616, features 618, location 612, time stamp for time 614 in location 612, and images captured by camera 321 in location 612 of results 173 onto the display. In one embodiment, results 173 includes location 612 and location 632. Tracker 401 instructs output device 403 to display a video or animation using images captured by camera 323 of location 632 and camera 321 of location 612 showing the movement of tracking object 601 over a time period from time 634 to time 614. In one embodiment, tracker 401 instructs output device 403 to display a highlight or an indication, such as a dot or a frame, of tracking object 601 at locations, such as location 612 and location 632, on a map of area 520. In one embodiment, tracker 401 instructs output device 403 to display a path connecting the indications over a time period from time 634 to time 612.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for tracking an object in an area using a plurality of cameras, comprising:
   (a) obtaining, by a tracking system, a first recognized object and first information associated with the first recognized object, the first recognized object being detected in at least one image captured by at least one camera of the plurality of cameras, the first information comprising at least two first features comprised in the first recognized object, at least two first locations of the at least two first features, first real-world dimensions of the first recognized object, and a first time;
   (b) obtaining, by the tracking system, a list of a plurality of tracking objects, each tracking object comprising a second recognized object and second information associated with the second recognized object, the second information comprising at least two second features comprised in the second recognized object, at least two second locations of the at least two second features, and second real-world dimensions of the second recognized object;
   (c) comparing, by the tracking system, the at least two first features comprised in the first recognized object with the at least two second features comprised in the second recognized object stored in a given tracking object, comparing the at least two first locations of the at least two first features with the at least two second locations of the at least two second features, and comparing the first real-world dimensions of the first recognized object with the second real-world dimensions of the second recognized object; and
   (d) in response to determining that the at least two first features match the at least two second features, the at least two first locations match the at least two second locations, and the first real-world dimensions matches the second real-world dimensions, storing, by the tracking system, the first information comprising the first time in the given tracking object.

2. The method of claim 1, wherein the first information further comprises a first location of the first recognized object, wherein the storing (d) comprises:
   (d1) in response to determining that the at least two first features match the at least two second features, the at least two first locations match the at least two second locations, and the first real-world dimensions matches the second real-world dimensions, storing, by the tracking system, the first information comprising the first time and the first location in the given tracking object.

3. The method of claim 1, further comprising:
   (e) receiving, by the tracking system, a query comprising one or more criteria;
   (f) processing the query, by the tracking system, by selecting any tracking object in the list of the plurality of tracking objects that match the one or more criteria in the query; and
   (g) responding to the query, by the tracking system, with results comprising information from any tracking object in the list of the plurality of tracking objects that match the one or more criteria in the query.

4. The method of claim 3, wherein the one or more criteria comprises a time criteria, wherein the processing (f) and the responding (g) comprise:
   (f1) processing the query, by the tracking system, by selecting any tracking object in the list of the plurality of tracking objects with a path that matches the time criteria in the query; and
   (g1) responding to the query, by the tracking system, with results comprising the path from any tracking object in the list of the plurality of tracking objects that matches the time criteria in the query.

5. The method of claim 3, wherein each tracking object in the list of the plurality of tracking objects comprises one or more locations of a corresponding recognized object, wherein the one or more criteria comprises a location criteria, wherein the processing (f) and the responding (g) comprise:
   (f1) processing the query, by the tracking system, by selecting any tracking object in the list of the plurality of tracking objects with the one or more locations that match the location criteria in the query; and (g1) responding to the query, by the tracking system, with results comprising the one or more locations from any tracking object in the list of the plurality of tracking objects that match the location criteria in the query.

6. The method of claim 1, wherein the first recognized object comprises a face, wherein the at least two first features comprises at least two first facial features of the face.

7. The method of claim 1, wherein the first recognized object comprises a vehicle, and wherein the at least two first features comprises at least two components of the vehicle.

8. The method of claim 1, wherein the first information further comprises a third first feature not comprised in the second information, wherein the method further comprises:
(e) updating, by the tracking system, the given tracking object second with the third first feature.

9. A non-transitory computer readable medium comprising computer readable program code embodied therein for tracking an object in an area using a plurality of cameras, wherein when executed by a processor causes the processor to:
(a) obtain a first recognized object and first information associated with the first recognized object, the first recognized object being detected in at least one image captured by at least one camera of the plurality of cameras, the first information comprising at least two first features comprised in the first recognized object, at least two first locations of the at least two first features, first real-world dimensions of the first recognized object, and a first time;
(b) obtain a list of a plurality of tracking objects, each tracking object comprising a second recognized object and second information associated with the second recognized object, the second information comprising at least two second features comprised in the second recognized object, at least two second locations of the at least two second features, and second real-world dimensions of the second recognized object;
(c) compare the at least two first features comprised in the first recognized object with the at least two second features comprised in the second recognized object stored in a given tracking object, compare the at least two first locations of the at least two first features with the at least two second locations of the at least two second features, and compare the first real-world dimensions of the first recognized object with the second real-world dimensions of the second recognized object; and
(d) in response to determining that the at least two first features match the at least two second features, the at least two first locations match the at least two second locations, and the first real-world dimensions matches the second real-world dimensions, store the first information comprising the first time in the given tracking object.

10. The medium of claim 9, wherein the first information further comprises a first location of the first recognized object, wherein in the store (d), the processor is further caused to:
(d1) in response to determining that the at least two first features match the at least two second features, the at least two first locations match the at least two second locations, and the first real-world dimensions matches the second real-world dimensions, store the first information comprising the first time and the first location in the given tracking object.

11. The medium of claim 9, wherein the processor is further caused to:
(e) receive a query comprising one or more criteria;
(f) process the query by selecting any tracking object in the list of the plurality of tracking objects that match the one or more criteria in the query; and
(g) respond to the query with results comprising information from any tracking object in the list of the plurality of tracking objects that match the one or more criteria in the query.

12. The medium of claim 11, wherein the one or more criteria comprises a time criteria, wherein in the process (f) and the respond (g), the processor is further caused to:
(f1) process the query by selecting any tracking object in the list of the plurality of tracking objects with a path that matches the time criteria in the query; and
(g1) respond to the query with results comprising the path from any tracking object in the list of the plurality of tracking objects that matches the time criteria in the query.

13. The medium of claim 11, wherein each tracking object in the list of the plurality of tracking objects comprises one or more locations of a corresponding recognized object, wherein the one or more criteria comprises a location criteria, wherein in the process (f) and the respond (g), the processor is further caused to:
(f1) process the query by selecting any tracking object in the list of the plurality of tracking objects with the one or more locations that match the location criteria in the query; and
(g1) respond to the query with results comprising the one or more locations from any tracking object in the list of the plurality of tracking objects that match the location criteria in the query.

14. The medium of claim 9, wherein the first recognized object comprises a face, wherein the at least two first features comprises at least two first facial features of the face.

15. The medium of claim 9, wherein the first recognized object comprises a vehicle, and wherein the at least two first features comprises at least two components of the vehicle.

16. The medium of claim 9, wherein the first information further comprises a third first feature not comprised in the second information, wherein the processor is further caused to:
(e) update the given tracking object with the third first feature.

17. A tracking system for tracking an object in an area using a plurality of cameras, comprising:
a processor; and
a non-transitory computer readable medium comprising computer readable program code embodied therein, wherein when executed by the processor causes the processor to:
(a) obtain a first recognized object and first information associated with the first recognized object, the first recognized object being detected in at least one image captured by at least one camera of the plurality of cameras, the first information comprising at least two first features comprised in the first recognized object, at least two first locations of the at least two first features, first real-world dimensions of the first recognized object, and a first time;
(b) obtain a list of a plurality of tracking objects, each tracking object comprising a second recognized object and second information associated with the second recognized object, the second information comprising at least two second features comprised in the second recognized object, at least two second locations of the at least two second features, and second real-world dimensions of the second recognized object;
(c) compare the at least two first features comprised in the first recognized object with the at least two second features comprised in the second recognized object stored in a given tracking object, compare the at least two first locations of the at least two first features with the at least two second locations of the at least two second features, and compare the first real-world dimensions of the first recognized object with the second real-world dimensions of the second recognized object; and
(d) in response to determining that the at least two first features match the at least two second features, the at least two first locations match the at least two second locations, and the first real-world dimensions matches the second real-world dimensions, store the first information comprising the first time in the given tracking object.

18. The system of claim 17, wherein the first information further comprises a first location of the first recognized object, wherein in the store (d), the processor is further caused to:
(d1) in response to determining that the at least two first features match the at least two second features, the at least two first locations match the at least two second locations, and the first real-world dimensions matches the second real-world dimensions, store the first information comprising the first time and the first location in the given tracking object.

19. The system of claim 17, wherein the processor is further caused to:
(e) receive a query comprising one or more criteria;
(f) process the query by selecting any tracking object in the list of the plurality of tracking objects that match the one or more criteria in the query; and
(g) respond to the query with results comprising information from any tracking object in the list of the plurality of tracking objects that match the one or more criteria in the query.

20. The system of claim 19, wherein the one or more criteria comprises a time criteria, wherein in the process (f) and the respond (g), the processor is further caused to:
(f1) process the query by selecting any tracking object in the list of the plurality of tracking objects with a path that matches the time criteria in the query; and
(g1) respond to the query with results comprising the path from any tracking object in the list of the plurality of tracking objects that matches the time criteria in the query.

21. The system of claim 19, wherein each tracking object in the list of the plurality of tracking objects comprises one or more locations of a corresponding recognized object, wherein the one or more criteria comprises a location criteria, wherein in the process (f) and the respond (g), the processor is further caused to:
(f1) process the query by selecting any tracking object in the list of the plurality of tracking objects with the one or more locations that match the location criteria in the query; and
(g1) respond to the query with results comprising the one or more locations from any tracking object in the list of the plurality of tracking objects that match the location criteria in the query.

22. The system of claim 17, wherein the first recognized object comprises a face, wherein the at least two first features comprises at least two first facial features of the face.

23. The system of claim 17, wherein the first recognized object comprises a vehicle, and wherein the at least two first features comprises at least two components of the vehicle.

24. The system of claim 17, wherein the first information further comprises a third first feature not comprised in the second information, wherein the processor is further caused to:
(e) update the given tracking object with the third first feature.

* * * * *